US009781176B2

(12) United States Patent
Xin et al.

(10) Patent No.: US 9,781,176 B2
(45) Date of Patent: Oct. 3, 2017

(54) MANAGING PERMISSIONS IN COLLABORATIVE WORKSPACES USING VISUAL REPRESENTATIONS OF CLIENTS

(71) Applicant: Smart Technologies ULC, Calgary (CA)

(72) Inventors: Min Xin, Calgary (CA); Erik Daniel Huizing, Calgary (CA); Eliezer Mar Yumol Manarang, Calgary (CA); Keith Matthew Allen, Calgary (CA); Allen Brooks, Escondido, CA (US); Sandra Chow, Toronto (CA)

(73) Assignee: SMART TECHNOLOGIES ULC, Calgary (CA)

( * ) Notice: Subject to any disclaimer, the term of this patent is extended or adjusted under 35 U.S.C. 154(b) by 471 days.

(21) Appl. No.: 14/620,224

(22) Filed: Feb. 12, 2015

(65) Prior Publication Data
US 2016/0241609 A1    Aug. 18, 2016

(51) Int. Cl.
*G06F 3/048* (2013.01)
*H04L 29/06* (2006.01)
(Continued)

(52) U.S. Cl.
CPC .......... *H04L 65/403* (2013.01); *G06F 3/0482* (2013.01); *G06F 3/04842* (2013.01); *H04L 67/125* (2013.01); *H04L 67/42* (2013.01)

(58) Field of Classification Search
CPC ................. G06F 3/011; G06F 3/04842; G09G 2320/0626
See application file for complete search history.

(56) References Cited

U.S. PATENT DOCUMENTS

2005/0132299 A1* 6/2005 Jones ............... G06F 3/0481
715/759
2005/0240873 A1* 10/2005 Czerwinski ........ G06F 3/0481
715/740
(Continued)

OTHER PUBLICATIONS

McGonnigle, Complete Guide to Google Drive Sharing, Mar. 1, 2015.*

*Primary Examiner* — William Bashore
*Assistant Examiner* — Rayeez Chowdhury
(74) *Attorney, Agent, or Firm* — King & Schickli, PLLC

(57) ABSTRACT

Certain aspects involve managing permissions in collaborative workspaces using visual representations of clients. For example, a graphical interface can be displayed that represents a collaborative workspace and that includes visual representations of different clients accessing the workspace. A workspace application executed by a processor can determine that visual representations for at least two clients are positioned in a common region of the graphical interface. The workspace application can authorize the clients to collaboratively modify electronic content that is accessible via the graphical interface based on the visual representations being positioned in the common region. Subsequently, the workspace application can determine that the visual representations are positioned outside the common region and restrict access to the collaboratively modified content accordingly. The workspace application can restrict each client to modifying a respective portion of the electronic content that was modified by the client when both visual representations were in the common region.

21 Claims, 5 Drawing Sheets

(51) Int. Cl.
  *G06F 3/0484* (2013.01)
  *G06F 3/0482* (2013.01)
  *H04L 29/08* (2006.01)

(56) References Cited

U.S. PATENT DOCUMENTS

| | | | |
|---|---|---|---|
| 2006/0010392 A1* | 1/2006 | Noel | G06F 3/0481 |
| | | | 715/759 |
| 2006/0168533 A1* | 7/2006 | Yip | G06Q 10/10 |
| | | | 715/753 |
| 2006/0195520 A1* | 8/2006 | Stevens | H04L 12/1827 |
| | | | 709/204 |
| 2007/0106810 A1* | 5/2007 | Ryman | H04L 29/06027 |
| | | | 709/230 |
| 2007/0282793 A1* | 12/2007 | Majors | G06F 17/30861 |

* cited by examiner

MANAGING PERMISSIONS IN COLLABORATIVE WORKSPACES USING VISUAL REPRESENTATIONS OF CLIENTS

TECHNICAL FIELD

This disclosure relates generally to computer-implemented methods and systems for collaborative workspaces and more particularly relates to a system for managing permissions in collaborative workspaces using visual representations of clients.

BACKGROUND

Interactive whiteboards and other interactive display devices can provide touch detection for computer applications and can display electronic content to large groups of users. For example, interactive whiteboards may be used in collaborative settings (e.g., in a classroom) in which multiple users add, modify, or otherwise manipulate electronic content via the whiteboard. Users can also add or modify to the electronic content of the whiteboard via mobile devices.

Prior solutions for collaborative workspace applications may present disadvantages. For example, a collaborative workspace may be used to group sets of participants in a shared space. The different participants may access the collaborative workspace via separate devices. Working in a virtual workspace on separate devices does not provide the same physical cues identifying members of a group or contributions of a group that would be provided in a real-world working environment.

Improved systems and methods are desirable for facilitating group work in collaborative workspaces.

SUMMARY

Systems and methods are described for managing permissions in collaborative workspaces using visual representations of clients.

For example, a graphical interface can be displayed that represents a collaborative workspace and that includes visual representations of different clients or groups of clients accessing the collaborative workspace on individual computing devices. A workspace application executed by a processor can determine that visual representations for at least two clients are positioned in a common region of the graphical interface. The workspace application can authorize the two clients to collaboratively modify electronic content that is accessible via the graphical interface based on both visual representations being positioned in the common region. Subsequently, the workspace application can determine that the visual representations are positioned outside the common region and restrict access to the collaboratively modified content accordingly. For example, the workspace application can restrict each client to modifying a respective portion of the electronic content that was modified by the client when both visual representations were in the common region.

These illustrative examples are mentioned not to limit or define the disclosure, but to provide examples to aid understanding thereof. Additional aspects and examples are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
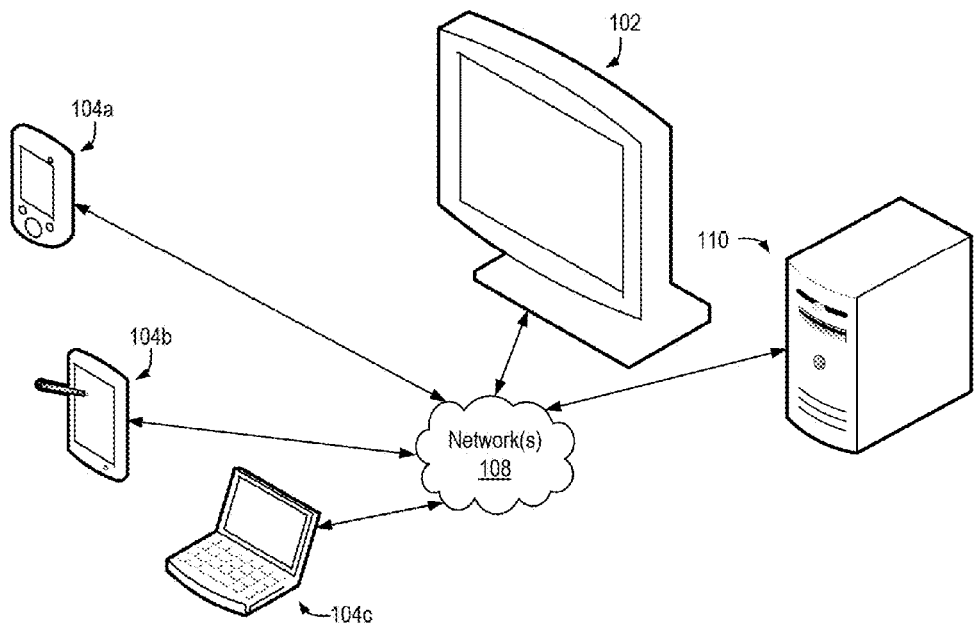
FIG. 1 is a block diagram depicting an example of a computing environment in which an interactive display device can communicate with multiple computing devices according to certain aspects of the present invention.

Aspects and examples are described for managing permissions in collaborative workspaces using visual representations of clients. In some aspects, these collaboration features can provide tools for coordinating group activities in shared digital environments, such as (but not limited to) classroom settings.

The following is provided to help introduce, without limitation, the general subject matter of certain aspects. In a classroom setting or other setting involving multiple participants, one or more workspace applications executed on one or more computing devices can provide a virtual collaborative workspace. A workspace application can allow a teacher or other group leader to assign students or other users to virtual work areas in the collaborative workspace. For example, the teacher can specify regions within a workspace and assign different groups of students to the regions. The regions within the workspace can be represented in a graphical interface by visually distinct areas corresponding to different groups of students. The graphical interface can be displayed on an interactive whiteboard used by the class as well as separate mobile computing devices used by the students. Each student is permitted to contribute to a region of the workspace corresponding to the student's assigned group and is prohibited from contributing to regions corresponding to other groups.

Regions to which students are assigned can be movable. The movable regions can control access to content in the workspace by different groups. In one example, content generated in a region by a group stays with the group as the region moves within the workspace. In another example, when regions overlap or otherwise contact one another, students belonging to the overlapping regions can contribute to the overlapped area. When overlapped regions are moved apart, the shared contributions are retained by both groups. Thus, the movable regions depicted in the graphical interface can provide visual representations of user groups within a collaborative workspace. The movable regions can also be used to enforce permissions in the collaborative workspace based on the virtual positions of different groups in the workspace.

In accordance with some aspects, a display device, such as an interactive whiteboard or other interactive display device, can display a graphical interface that represents a collaborative workspace. The graphical interface includes visual representations of different clients or groups of clients that access the collaborative workspace. For example, a visual representation of a group of clients, such as a box or circle, can be displayed in a region of the graphical interface to depict the group's virtual position within the workspace. A workspace application can be executed by a server or other processing device to manage access to the collaborative workspace. For example, the workspace application can determine that visual representations for at least two clients or groups of clients are positioned in a common region of the graphical interface. The workspace application can authorize computing devices corresponding to the two clients or groups of clients to collaboratively modify electronic content that is accessible via common region in the graphical interface. For example, both clients can modify different portions of a drawing within the overlap region. Subsequently, the workspace application can determine that the visual representations are positioned outside the common region and restrict access to the collaboratively modified content accordingly. For example, the workspace application can restrict each client to modifying a respective portion of the electronic content that was modified by the client when both visual representations were in the common region.

As used herein, the term "interactive display device" can refer to a device that can receive or otherwise detect touch inputs or other types of inputs from users and generate outputs in response to the received inputs. A non-limiting example of an interactive display device is an interactive whiteboard that can be communicatively coupled to a computing device.

As used herein, the term "computing device" can refer to any computing device configured to execute program code and to communicate with the interactive display device and/or other computing devices. A computing device can include or be communicatively coupled to a display screen. Non-limiting examples of computing devices include smart phones, tablet computers, laptop computers, desktop computers, etc. Computing devices can allow users to access and manipulate content on the interactive display device. For example, the computing device can display a portion of the content from the collaborative workspace based on user interaction. Users can manipulate an interface on the computing device to access a specific portion of the content (e.g., swiping the display on the computing device with a finger to indicate a specific position and zoom level of the content).

As used herein, the term "collaborative workspace" can refer to an interactive environment including electronic content that multiple computing devices can view and access. The collaborative workspace can be displayed on an interactive display device. A non-limiting example of a collaborative workspace includes a virtual environment depicted by a geographic map on the interactive display device.

As used herein, the term "virtual position" can refer to a set of coordinates in a collaborative workspace such as (but not limited to) Cartesian coordinates. A virtual position can also include information describing a zoom level with respect to a region of the collaborative workspace. The virtual position associated with a computing device can indicate which portion of the collaborative workspace the computing device is accessing and viewing.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Referring now to the drawings, FIG. 1 is a block diagram depicting an example of a computing environment in which multiple computing devices 104*a-c* can collaborate using a collaborative workspace accessible via an interactive display device 102. A non-limiting example of an interactive display device 102 is an interactive white board or other touch screen device that is sufficiently large to be viewed by multiple individuals at a location in which the computing devices 104*a-c* are positioned. The computing devices 104*a-c* can display graphical interfaces corresponding to some or all of the collaborative workspace. The interactive display device 102 can display a graphical interface corresponding to the entirety of the collaborative workspace or a portion of the workspace having a size greater than or equal to the combination of the portions of the collaborative workspace displayed on the computing devices 104*a-c*.

The interactive display device 102 can communicate with the computing devices 104*a-c*. Non-limiting examples of the computing devices 104*a-c* may include a smart phone, a tablet computer, a laptop computer, or any other computing device. In some aspects, a computing device can communicate directly with the interactive display device 102 via a short-range wireless communication link. For example, in the computing environment depicted in FIG. 1, the interactive display device 102 is communicatively coupled to the computing devices 104*a-c* via a network 108. In additional or alternative aspects, the computing devices 104*a-c* can communicate with the interactive display device 102 via a server 110 or other computing device. In some aspects, the server 110 can include multiple servers configured for cloud computing. The server 110 or other computing device can communicate with the computing device and the interactive display device 102 via one or more suitable data networks 108. For example, in the computing environment depicted in FIG. 1, the interactive display device 102, the computing devices 104*c*, 104*d*, and a server 110 are communicatively coupled to one another via one or more data networks 108 (e.g., via an Ethernet network).

For illustrative purposes, FIG. 1 depicts a single interactive display device 102 in communication with three computing devices 104*a-c*. Other implementations are possible. For example, any number of interactive display devices may communicate with any number of computing devices.

Figure 2:
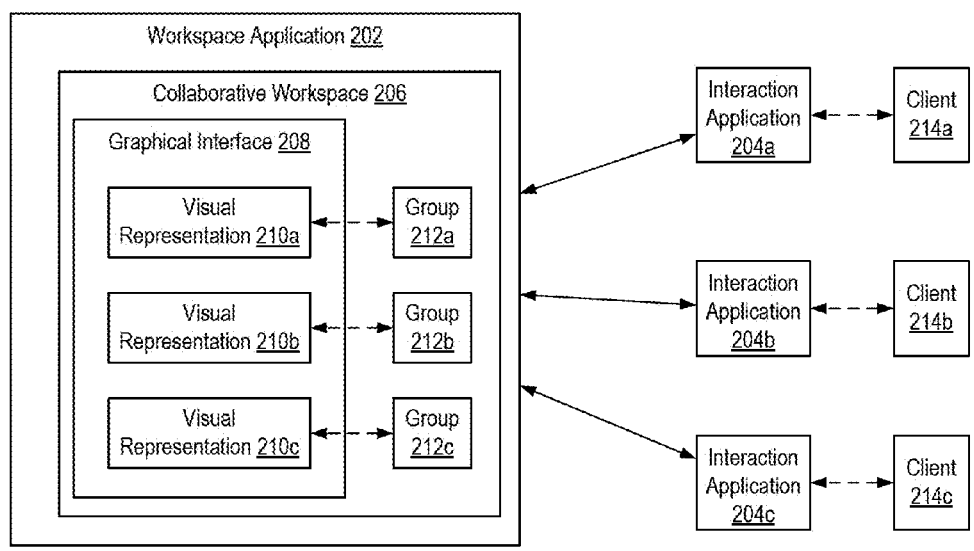
FIG. 2 is a block diagram depicting an example of a workspace application that can be executed using the computing environment depicted in FIG. 1 according to certain aspects of the present invention.

FIG. 2 is a block diagram depicting an example of a workspace application 202 that can be executed using the computing environment depicted in FIG. 1. The workspace application 202 can be executed by one or more processing devices included in the interactive display device 102 and/or the server 110. The workspace application 202 can receive input data from interaction applications 204a-c that are executed by the computing devices 104a-c. In some aspects, the interaction applications 204a-c can be client instances of the workspace application 202. For example, processing can performed by the server 110 that executes the workspace application 202, and the interaction applications 204a-c can filter content received from or accessed using the server 110.

The workspace application 202 can include program code executable by one or more processing devices included in or communicatively coupled to the interactive display device 102 or the server 110. The program code can be included in software or firmware installed on a non-transitory computer-readable medium that is included in or communicatively coupled to the interactive display device 102 or the server 110. Executing the workspace application 202 can configure the interactive display device 102 to perform one or more operations for receiving inputs (e.g., touch screen inputs, instructions or requests from computing devices 104a-c), and presenting outputs in response to the inputs.

For example, executing the workspace application 202 can perform one or more operations including generating a graphical interface 208 and visual representations 210a-c within the graphical interface 208. The workspace application 202 can configure a display screen, which may be included in or communicatively coupled to the interactive display device 102, to display the graphical interface 208 and one or more of the visual representations 210a-c. The graphical interface 208 can visually represent the collaborative workspace 206 by, for example, allowing clients 214a-c using interaction applications 204a-c to provide inputs to and receive outputs from the collaborative workspace 206. The visual representations 210a-c can visually represent the groups 212a-c to which respective clients 214a-c respectively belong. For example, in a classroom or other group setting using the collaborative workspace 206, clients (e.g., students in a classroom) can be assigned to different groups.

Each of the interaction applications 204a-c can include program code executable by one or more processing devices in a respective one of the computing devices 104a-c. The program code can be included in software or firmware installed on each of the computing devices 104a-c. Executing the interaction applications 204a-c can allow users of the respective computing devices 104a-c to provide input to the workspace application 202 or otherwise manipulate the content of the collaborative workspace 206. An interaction application can include any application suitable for communicating with the workspace application 202. Non-limiting examples of an interaction application include native applications specifically configured for communicating with the workspace application 202, web browser applications configured to access a collaborative workspace via the Internet, etc.

For purposes of illustration, FIG. 2 depicts a simple example of the groups, clients, and applications involved in the collaborative workspace 206. For example, FIG. 2 depicts one client 214a in the group 212a that uses one interaction application 204a, one client 214b in the group 212b that uses one interaction application 204b, and one client 214c in the group 212c that uses one interaction application 204c. However, as described herein, any number of groups used by the workspace application 202 can include any number of clients using any number of interaction applications executed on any number of computing devices. FIG. 2 also depicts the workspace application 202 and the interaction applications 204a-c as individual functional blocks for illustrative purposes, but other implementations are possible. For example, one or more of the workspace application 202 and the interaction applications 204a-c may include program code that is integrated into or otherwise included in the program code of another application executed by a given device.

Figure 3:
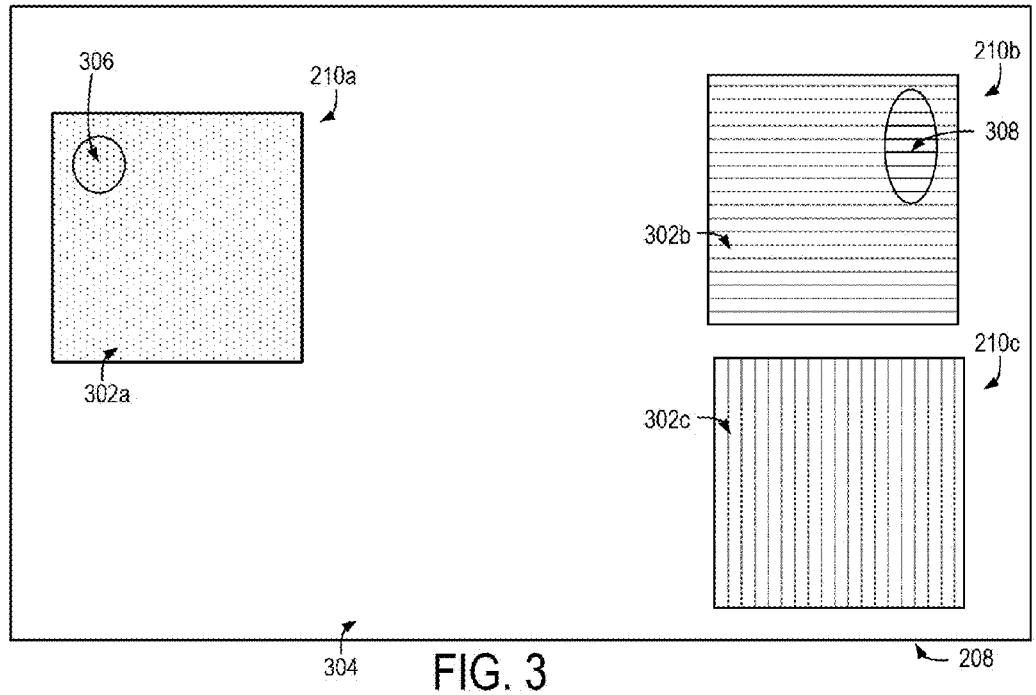
FIG. 3 is a diagram depicting an example of a graphical interface that represents a collaborative workspace and examples of visual representations in the graphical interface that represent groups of clients accessing the collaborative workspace according to certain aspects of the present invention.

FIG. 3 is a diagram depicting an example of a graphical interface 208 that represents a collaborative workspace and examples of visual representations 210a-c within the graphical interface 208 that represent groups 212a-c accessing the collaborative workspace 206. Each of the groups 212a-c is visually represented in the graphical interface 208 by a respective one of the visual representations 210a-c (e.g., square-shaped regions that are displayed in the graphical interface 208). The visual representations 210a-c are movable within the graphical interface 208.

The graphical interface 208 depicted in FIG. 3 includes regions 302a-c that are occupied by the movable visual representations 210a-c. The workspace application 202 can use the moveable visual representations 210a-c within the graphical interface 208 to provide, facilitate, enforce, or otherwise use permissions for clients 214a-c associated with interaction applications 204a-c, as described herein. For example, modifications to content in regions 302a-c can be restricted to the respective groups 212a-c represented by the respective visual representations 210a-c.

The graphical interface 208 depicted in FIG. 3 can be displayed on an interactive display device 102. At least a portion of the graphical interface 208 depicted in FIG. 3 can be displayed on the computing devices 104a-c. In some aspects, the boundaries of the collaborative workspace 206 can be defined by a coordinate space used by the graphical interface 208. A coordinate space can specify a maximum height and a maximum length for the graphical interface 208. For example, the graphical interface 208 may have a maximum length of 6,000 pixels and a maximum height of 4,000 pixels. A virtual position on the collaborative workspace 206 can be identified using a set of coordinates within the coordinate space. For example, a coordinate set (0, 0) can identify a top left corner of the graphical interface 208 representing the collaborative workspace 206. A coordinate set of (6,000, 4,000) can identify the bottom right corner of the collaborative workspace 206.

In some aspects, each of the computing devices 104a-c can independently display a portion or version of the graphical interface 208 representing the collaborative workspace 206. For example, each display screen of a respective one of the computing devices 104a-c can display a different version of the graphical interface 208 that shows a different aspect of the collaborative workspace 206. A computing device can notify a processing device executing the workspace application 202 of the computing device's virtual position by, for example, transmitting data indicative of the virtual position to the processing device via a data network 108. The data indicative of the virtual position can include one or more of a coordinate set for the computing device, a zoom level, and a native resolution of the computing device. A processing device included in or communicatively coupled to the interactive display device 102 can monitor a respective virtual position associated with each of the computing devices 104a-c or groups of computing devices. Each of the virtual positions can include a specific coordinate set identifying a location in the collaborative workspace 206.

The workspace application 202 can enforce or otherwise use permissions with respect to the collaborative workspace 206 that are based at least partially on virtual positions of virtual groups 212a-c within the collaborative workspace 206. For example, the workspace application 202 can modify content 306 associated with the region 302a in response to inputs received from a client corresponding to the visual representation 210a. The workspace application 202 can also modify content 308 associated with the region 302b in response to inputs received from a client corresponding to the visual representation 210b. The workspace application 202 can disregard (and/or cause the interaction application 204a to disregard) inputs from the group 212a with respect to the region 302b based on the visual representation 210b occupying that portion of the graphical interface 208. The workspace application 202 can also disregard (and/or cause the interaction application 204b to disregard) inputs from group 212b with respect to the region 302a based on the visual representation 210a occupying that portion of the graphical interface 208.

Figure 4:
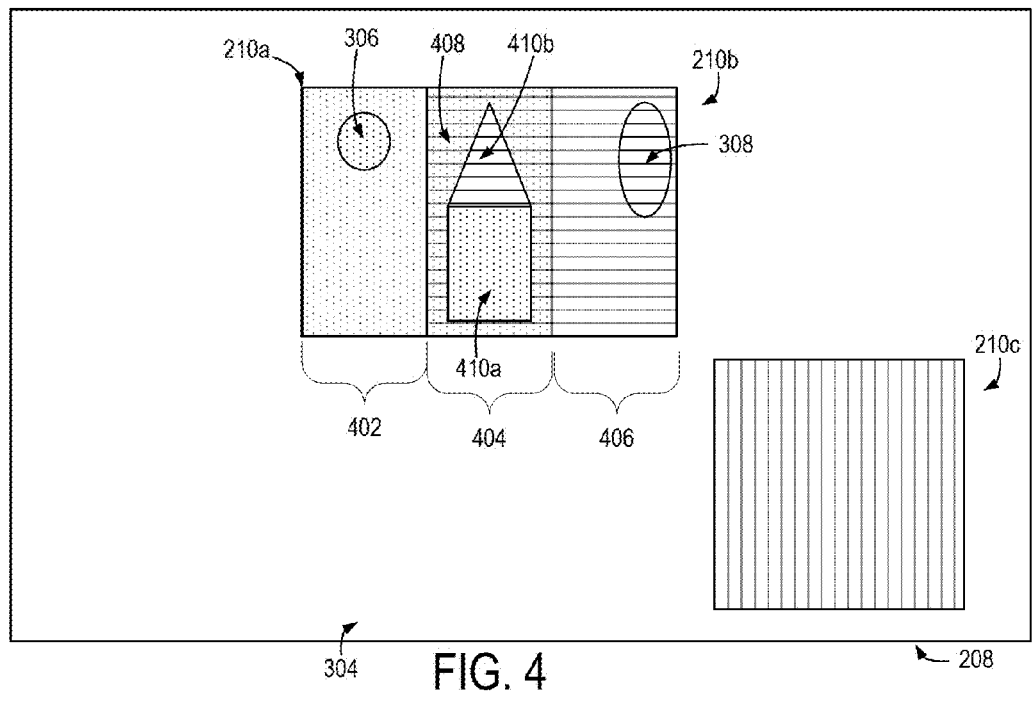
FIG. 4 is a diagram depicting collaborative modification of content in the collaborative workspace based on contact between the visual representations of different client groups depicted in FIG. 3 according to certain aspects of the present invention.
Figure 5:
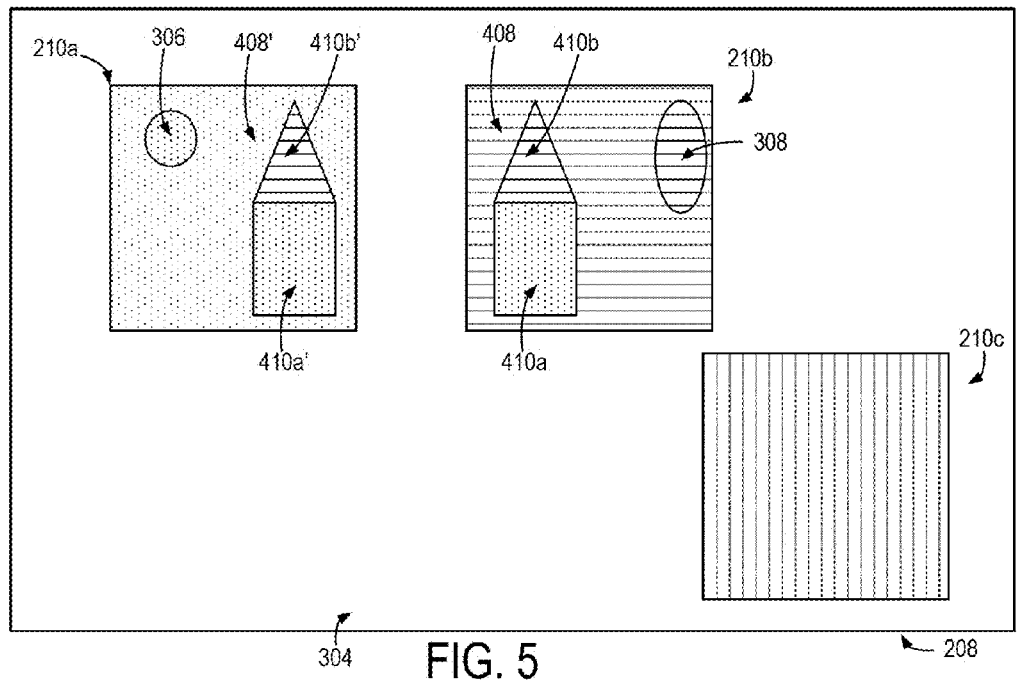
FIG. 5 is a diagram depicting the collaboratively modified content of FIG. 4 being separately accessible by different client groups after separating the visual representations of the client groups according to certain aspects of the present invention.
Figure 6:
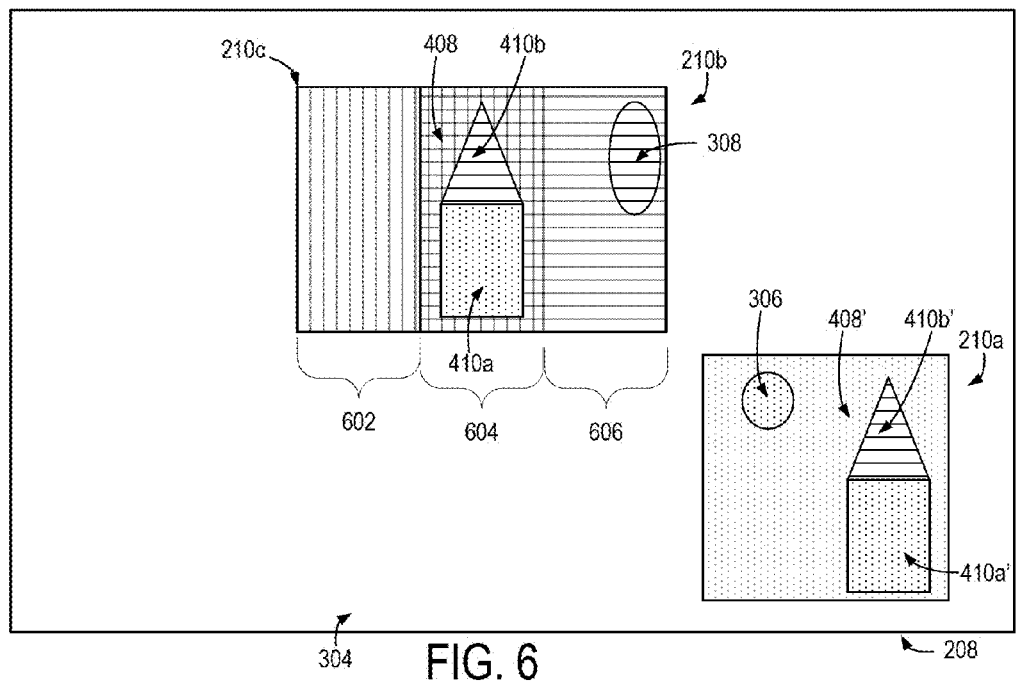
FIG. 6 is a diagram depicting collaborative modification of the content of FIG. 4 based on another overlap between visual representations of another set of client groups according to certain aspects of the present invention.

In some aspects, the content 306, 308 can be generated by the respective groups 212a, 212b while visual representations 210a, 210b respectively occupy the regions 302a, 302b. The workspace application 202 may be configured such that the content 306, 308 generated by the groups 212a, 212b in those regions is moved with the visual representations 210a, 210b, as depicted in FIGS. 4-6. For example, content 306 generated by the group 212a can be moved with the visual representation 210a as the visual representation 210a is moved within the graphical interface 208. Additionally or alternatively, the workspace application 202 may be configured such that the content 306, 308 generated by the groups 212a, 212b remains in the regions 302a, 302b after the visual representations 210a, 210b are moved from those regions.

Content items accessible via the graphical interface 208 and the collaborative workspace 206 may lack any persistent association with permission information. The workspace application 202 can manage access to the content based on position information for visual representations of content and visual representations of client groups. For example, content can be generated or provided to the collaborative workspace 206 for display in the regions 302a-c prior to the visual representations 210a-c occupying those regions (e.g., by a teacher or other moderator having unrestricted access throughout the collaborative workspace 206). The workspace application 202 can cause access to content in these regions to be restricted to the groups 212a-c while the visual representations 210a-c occupy the regions 302a-c, then make the content freely accessible after the visual representations 210a-c move away from the regions 302a-c.

For example, a document or other electronic content can be associated with collaborative workspace 206 and accessible via the graphical interface 208. The document or other electronic content may lack any persistent permissions that generally restrict access by a particular one of the clients 214a-c or one of the groups 212a-c (e.g., identifying certain clients as always having read access, write access, etc.). The workspace application 202 can impose temporary restrictions on the content based on the content being displayed in a region occupied by a visual representation (e.g., limiting access to the content in a region 302a based on the visual representation 210a being positioned in that region).

In additional or alternative aspects, the workspace application 202 can restrict access to content in a region based on the absence of visual representations 210a-c in that region. For example, a document or other electronic content can be associated with collaborative workspace 206 and can be made accessible via a region the graphical interface 208 (e.g., as a result of a teacher placing the content in the collaborative workspace 206 used for a classroom activity). The workspace application 202 may prevent access to the document via the collaborative workspace 206 based on a visual representation of a group being outside the region in which the document is represented (e.g., by an icon displayed on the graphical interface 208). The workspace application 202 may allow access to the document via the collaborative workspace 206 based on a visual representation of a group occupying or otherwise contact the region in which the document is represented.

Any suitable technique can be used to control access to electronic content based on the location of visual representations 210a-c. For example, electronic content may include or be associated with location-based permissions data. The location-based permissions data can restrict or permit access by clients or groups of clients based on a relationship between a position in the graphical interface 208 of a visual representation of the electronic content and a position of a visual representation of a client group. An example of permissions data is a file that includes one or more rules identifying one or more virtual positions required for accessing an electronic content item. Examples of these rules include a Boolean function that determines whether one or more coordinates of a client's virtual representation is the same as one or more coordinates of a content item's virtual representation, a function that determines that a distance between one or more coordinates of a client's virtual representation and one or more coordinates of a content item's virtual representation is within a threshold distance, etc. Another example of permissions data is a file that identifies virtual positions of content within the collaborative workspace 206 (e.g., the locations of virtual representations displayed on the graphical interface 208) and virtual positions of groups within the collaborative workspace 206. The file can include one or more rules identifying operations to be performed by the workspace application 202 in response to determining that a group's virtual position overlaps, contacts, or is otherwise within a threshold distance of a content item's virtual position. The operations can enforce the location-based permissions described herein (e.g., preventing access to content by one group if another group has occupied a region including the content, etc.).

In some aspects, the graphical interface 208 may include a region 304 that is accessible by any client. The region 304 can be a portion of the graphical interface 208 that is not associated with persistent restrictions on modifications to content (e.g., "white space" in an interactive whiteboard). This absence of persistent restrictions can include an absence of restrictions based on an identity of a client or a group of client. For example, in FIG. 3, any of the clients 214a-c can modify, create, or otherwise use content in the region 304.

The workspace application 202 can enforce or otherwise use permissions for different clients in any suitable manner. In some aspects, the workspace application 202 can transmit instructions or other messages to the interaction applications 204a-c that identify permissions for different clients. The interaction applications 204a-c can respond to the instructions or other messages by permitting or preventing users certain actions by users of the interaction applications 204a-c. For example, if an interaction application has received a message from the workspace application 202 indicating that a user of the interaction application is prohibited from accessing a certain region of the graphical interface 208, the interaction application can reject or otherwise disregard inputs received from a user that indicate a desire to access the prohibited region.

In some aspects, the workspace application 202 can manage permissions within the collaborative workspace 206 based on time periods. For example, during a first time period, each client associated with the collaborative workspace 206 can access any portion in the collaborative workspace 206 (e.g., each interaction application can be configured to respond to inputs received in any portion of the graphical interface 208 representing the collaborative workspace 206). During a second time period, different groups of clients can be restricted using the visual representations of the client groups, as described herein. During a third time period, all clients can again be allowed to access any portion in the collaborative workspace 206. Managing permissions within the collaborative workspace 206 based on time periods can allow, for example, a teacher or other facilitator to allow all participants to work together at the start of a session (e.g., an instruction phase), subdivide the participants into groups for a portion of the session (e.g., an phase for working as individuals or sub-groups), and then allow all participants to work together at the end of a session (e.g., a review or evaluation phase).

In some aspects, if two or more of the visual representations 210a-c overlap or otherwise contact one another in a given region of the graphical interface 208, the groups represented by the visual representations can collaborate in the generation, modification, or other use of content accessible via the graphical interface 208. For example, FIG. 4 is a diagram depicting collaborative modification of content 408 in the collaborative workspace 206 based on contact between visual representations 210a, 210b of different client groups 212a, 212b in region 404. In region 404, the groups 212a, 212b can collaboratively generate, modify, or otherwise use content 408. In regions 402, 406, no overlap exists between the visual representations 210a, 210b. The workspace application 202 may prevent group 212b from using content in the region 402 occupied only by the visual representation 210a of group 212a and may prevent group 212a from using content in the region 406 occupied only by the visual representation 210b of group 212b.

As depicted in FIG. 4, the group 212a represented by the visual representation 210a and the group 212b represented by the visual representation 210b can cooperatively draw the house in the overlap region 404. The workspace application 202 may display the content portion 410a in response to one or more inputs (e.g., drawing strokes) received from one or more clients 214a via one or more interaction applications 204a. The workspace application 202 may display the content portion 410b in response to one or more inputs (e.g., drawing strokes) received from one or more clients 214b via one or more interaction applications 204b. For ease of illustration, contributions to the content 408 from the group 212a are depicted with the same pattern as the visual representation 210a, and contributions from the group 212b are depicted with the same pattern as the visual representation 210b.

In some aspects, each of the visual representations 210a-c has the same dimensions in a graphical interface 208. In other aspects, different visual representations 210a-c have different dimensions in a graphical interface 208. Using visual representations having different dimensions can allow the workspace application 202 to enforce or otherwise use different permissions for different clients or groups of clients working collaboratively. For example, a first visual representation may have dimensions that allow a second visual representation to be fully overlapped by the first visual representation without the second visual representation fully overlapping by the first visual representation (e.g., the second visual representation being fully enclosed within a corner or other region of the first visual representation). In this example, a first client or group of clients corresponding to the first visual representation has access to all of the same content as a second client or group of clients corresponding to the second visual representation. The second client or group of clients has access to content associated with the portion of the first visual representation overlapping the second visual representation, but not the portion of the first visual representation that does not overlap the second visual representation.

In some aspects, the workspace application 202 can allow each of the groups 212a-c to authorize collaboration with one or more other groups. For example, the workspace application 202 can receive an input indicating that one or more clients represented by the visual representation 210a wish to move the visual representation 210a to a position in the graphical interface 208 that overlaps or otherwise a position of the visual representation 210b. The workspace application 202 can transmit a message to one or more interaction applications 204b associated with a group 212b represented by the visual representation 210b. The message can solicit an authorization for the group 212a to collaborate with the group 212b. The workspace application 202 can receive a response from one or more interaction applications 204b regarding the solicited authorization. If the response indicates that the authorization is granted, the workspace application 202 can cause the visual representation 210a to be moved to a position in the graphical interface 208 that overlaps or otherwise a position of the visual representation 210b, thereby allowing the collaboration. If the response indicates that the authorization is denied, the workspace application 202 can prevent the visual representation 210a from being moved to the position in the graphical interface 208 that overlaps or otherwise contacts a position of the visual representation 210b, thereby preventing the collaboration. In additional or alternative aspects, the response can identify one or more permissions for the collaboration, such as (but not limited to) allowing one or more other groups to copy, edit, comment, move, or otherwise manipulated collaboratively used content.

Although FIG. 4 depicts an overlap between the visual representations 210a, 210b in a region 404, other implementations are possible. In one example, contact between edges of the visual representations 210a, 210b in the region 404 may be sufficient to allow collaborative modification of content in the region 404. In another example, the visual representations 210a, 210b being within a threshold distance of the region 404 may be sufficient to allow collaborative modification of content in the region 404.

In some aspects, if the overlapping visual representations 210a, 210b are subsequently separated, the group 212a may be restricted to modifying a portion 410a contributed by the group 212a and the group 212b may be restricted to modifying a portion 410b contributed by the group 212b. For example, FIG. 5 is a diagram depicting the collaboratively modified content 408 being separately accessible by different client groups 212a, 212b after separating the visual representations 210a, 210b. As depicted in FIG. 5, the visual representations 210a, 210b no longer overlap or otherwise contact one another. The workspace application 202 can provide access to at least some of the content 408 by each of the groups 212a, 212b. In one example, the workspace application 202 can cause group 212a to be able to modify the portion 410a and cause group 212b to be able to modify the portion 410b. In another example, the workspace application 202 can cause both groups 212a, 212b to be able to modify any of the content 408.

The workspace application 202 can use any suitable technique for providing separate access to the content 408 by the groups 212a, 212b after the separation of the visual representations 210a, 210b. In some aspects, the workspace application 202 can generate two copies of the content 408 that are stored in a memory device. The workspace application 202 provides access to each copy by one of the groups 212a, 212b. The workspace application 202 can generate a separate visual representation (represented as content 408 and content 408' in FIG. 5) for each copy in the graphical interface 208. The workspace application 202 can restrict access to certain portions of each copy of the content 408, as described above. In additional or alternative aspects, the workspace application 202 can generate two visual representations of the content 408 (represented as content 408 and content 408' in FIG. 5) and associate each visual representation with a respective one of the groups 212a, 212b. The workspace application 202 can allow each of the two visual representations to access the same copy of the content 408 that is stored in a memory device. The workspace application 202 can restrict access to certain portions of the content 408 that is stored in a memory device based on which of the visual representations is used to access the content 408, as described above.

In some aspects, a third group 212c can receive limited access to the content that was collaboratively generated by the groups 212a, 212b in the overlap region 404. For example, FIG. 6 is a diagram depicting collaborative modification of the content 408 based on contact between visual representations 210b, 210c of the groups 212b, 212c. If the visual representations 210a, 210b are separated after the groups 212a, 212b collaboratively generate content 408, the visual representation 210b may subsequently overlap with the visual representation 210c in the region 604. In the region 604 of the graphical interface 208, the groups 212b, 212c can collaboratively generate, modify, or otherwise use the content 408.

In the regions 602, 606 of the graphical interface 208, no overlap exists between the visual representations 210b, 210c. The workspace application 202 may prevent group 212b from using content in the region 602 occupied only by the visual representation 210c of group 212c and may prevent group 212c from using content in the region 606 occupied only by the visual representation 210b of group 212b.

In some aspects, the workspace application 202 can allow group 212c to modify any portion of the content 408 other than the portion 410a generated by the group 212a. For example, the group 212c may be permitted to modify or otherwise use portion 410b based on the visual representations 210b, 210c overlapping or otherwise being in contact with one another in the region 604. In additional or alternative aspects, the workspace application 202 can solicit authorization from an interaction application 204a associated with the group 212a to allow one or more of the groups 212b, 212c to modify the portion 410a in the region 604. The workspace application 202 can allow or deny authorization to one or more of the groups 212b, 212c based on a response received from the interaction application 204a.

In some aspects, the workspace application 202 can respond to a subsequent separation between visual representations 210a, 210b by providing access to all of the collaboratively generated or modified content, regardless of which one of the groups associated with visual representations 210a, 210b contributed a given portion of the content. In additional or alternative aspects, the workspace application 202 can respond to a subsequent separation between visual representations 210a, 210b by limiting access to the collaboratively generated or modified content to given portion of the content to the group that contributed the portion. In additional or alternative aspects, the workspace application 202 can respond to a subsequent separation between visual representations 210a, 210b by soliciting input from a represented group 212a regarding whether the represented group 212b is permitted to access a portion of content contributed by the group 212a. In additional or alternative aspects, the workspace application 202 can respond to a subsequent separation between visual representations 210a, 210b by soliciting input from a represented group 212a regarding whether the represented group 212a wishes to restrict access by the represented group 212b to a portion of content contributed by the group 212a.

In some aspects, the workspace application 202 moves one or more of the visual representations 210a-c in response to instructions or other data received from one or more clients included in one or more of the groups 212a-c. For example, a group 212a may include multiple clients 214a that access the collaborative workspace 206 via multiple interaction applications 204a-c. The workspace application 202 can modify the graphical interface 208 to depict a movement of the visual representation 210a based on inputs that are received from at least a subset of the clients 214a. Examples of a subset can include a majority of the clients 214a, a threshold number of the clients 214a that may be less than a majority, one or more specific clients 214a having decision-making authority (e.g., a group leader or set of group leaders), etc.

In additional or alternative aspects, the workspace application 202 moves a visual representation in response to instructions or other data received from one or more clients that are not included in a group corresponding any of the visual representations 210a-c. For example, the workspace application 202 may identify one or more clients as moderators (e.g., clients associated with users such as teachers, group leaders, or other individuals that manage or facilitate interaction among groups of users). Moderator clients may be permitted to access content via different regions of the graphical interface irrespective of any permissions associated with the visual representations 210a-c. A moderator client can, for example, have access to all content in the collaborative workspace 206. A teacher or other individual can use the workspace application 202 to make content available in the collaborative workspace 206 and specify a particular group of users that are to use the content. For example, the workspace application 202 may receive a first input from a moderator client identifying a position in the graphical interface 208 via which access to a content item is provided. The workspace application 202 may receive a second input from the moderator client indicating that a virtual representation for a group of client is to be moved to the position in the graphical interface 208. The workspace application 202 can update the position of the group's visual representation to at least partially overlap or otherwise contact the position for the content item. The workspace application 202 can notify interaction applications for the group of clients that the group's visual representation has been moved and the clients are permitted to access the content item at the virtual position in the collaborative workspace 206.

In some aspects, visual representations can be used to prevent any access (including read access) by one or more clients to portions of the collaborative workspace 206 occupied by another client. For example, the workspace application 202 may cause content in the portion of the graphical interface 208 occupied by the visual representation 210a to be inaccessible to clients that are not represented by the visual representation 210a (e.g., the groups 212b, 212c). In various aspects, the workspace application 202 can do so based on inputs received by a moderator (e.g., a teacher who does not want different groups of students to see what others are doing), by client in a group, or some combination thereof.

In some aspects, the workspace application 202 can control the visibility of different portions of the graphical interface 208. For example, markings or other content in a region 304 can be visible to all groups 212a-c, and the visibility of content in regions associated with visual representations 210a-c can be restricted to the respective groups 212a-c. For example, group 212a may be limited to viewing content in the common region 304 and a region covered by or otherwise associated with the visual representation 210a; for regions associated with the visual representations 210b, 210c, group 212a can be allowed to see the visual representations 210b, 210c but not any content used by the groups 212b, 212c in those regions. In some aspects, overlap between visual representations can allow the associated groups to view content in both the overlap region and the non-overlapped region. For example, in the scenario depicted in FIG. 4, the groups 212a, 212b may view content in each of the regions 402, 404, 406. In other aspects, overlap between visual representations can allow the associated groups to view content in the overlap region, but not the non-overlapped regions associated with each group. For example, in the scenario depicted in FIG. 4, groups 212a, 212b may view content in the region 404, group 212a may be restricted to viewing content in region 402, and group 212b may be restricted to viewing content in region 406.

In some aspects, a client can be assigned to a group based on one or more assessments performed using the workspace application 202. For example, during a first period in a collaborative session, each participant may be assigned a task (e.g., a basic skills test). The workspace application 202 can evaluate the work performed on the task (e.g., scoring the test). The workspace application 202 can assign different clients to different groups based on the evaluation of the task. For example, the teacher can assign low-scorers to a group for performing remedial work in a first portion of the collaborative workspace 206 and can assign high-scorers to a group for performing advanced work in a second portion of the collaborative workspace 206. In additional or alternative aspects, the workspace application 202 can reassign (automatically or in response to input from a moderator) a client from a first group to a second group based on an evaluation of work performed by the client in the first group (e.g., by moving a client from a "remedial work" group to an "advanced work" group based on a successful completion of one or more remedial tasks).

Figure 7:
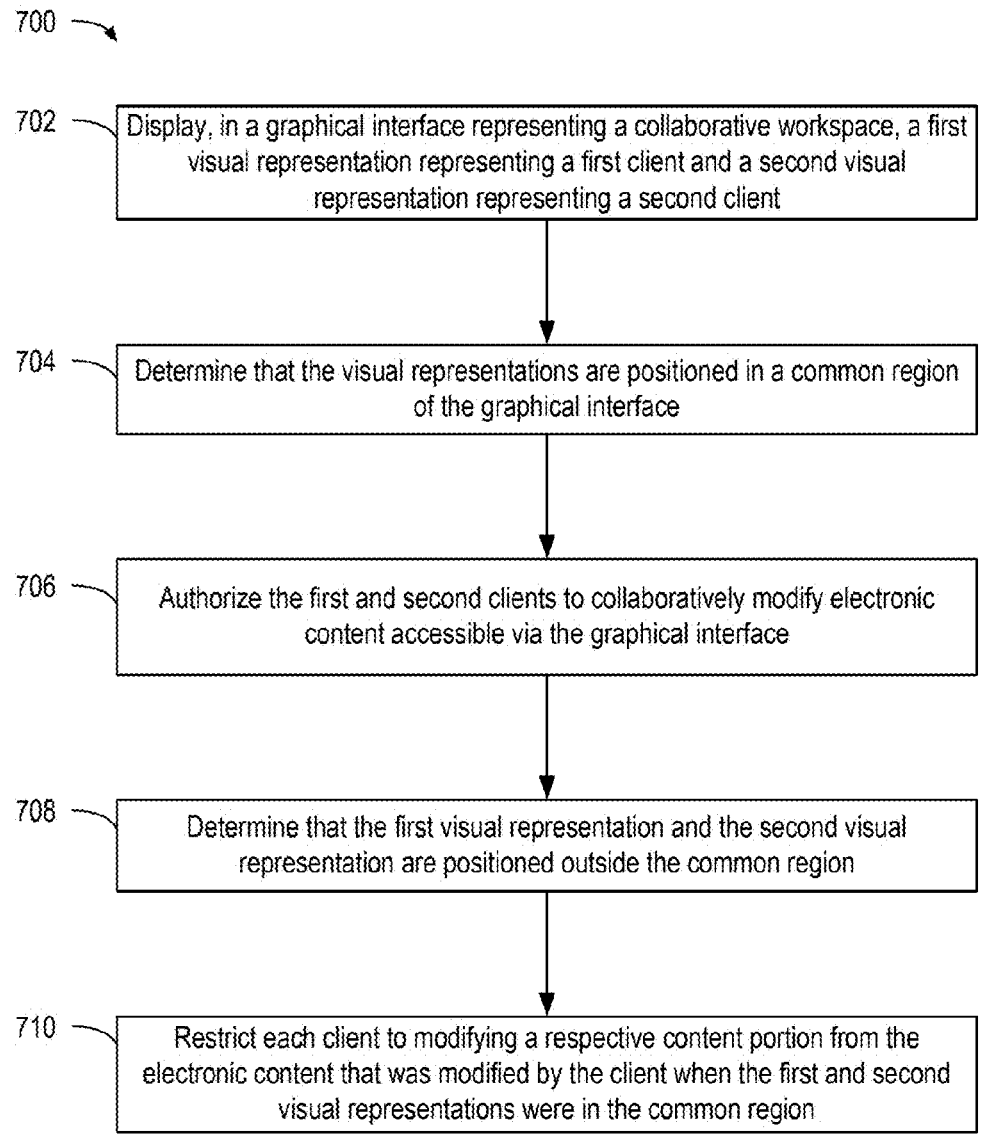
FIG. 7 is a flowchart depicting an example of a method for managing permissions in collaborative workspaces using visual representations of clients according to certain aspects of the present invention.

FIG. 7 is a flowchart depicting an example of a method 700 for managing permissions in a collaborative workspace 206 using visual representations 210a-c of clients 214a-c. For illustrative purposes, the method 700 is described with reference to the aspects and examples depicted in FIGS. 1-6. Other implementations, however, are possible.

The method 700 involves configuring a display device to display a graphical interface that represents a collaborative workspace and that includes a first visual representation representing a first client and a second visual representation representing a second client, as depicted in block 702. For example, one or more of the interactive display device 102 and the server 110 can include a processing device that executes suitable program code defining a workspace application 202. The workspace application 202 can be stored on a memory device that is included in or communicatively coupled to the interactive display device 102 and/or the server 110. Executing the workspace application 202 can configure the processing device to perform operations such as, for example, displaying the visual representations 210a-c in a graphical interface 208, as described above with respect to FIG. 3.

The method 700 also involves determining that the first visual representation and the second visual representation are positioned in a common region of the graphical interface, as shown in block 704. For example, a processing device can execute suitable program code, such as one or more components of the workspace application 202, that is stored in a non-transitory computer readable medium. Executing the workspace application 202 can configure the processing device to perform operations such as, for example, determining that the visual representations 210a, 210b are positioned in a common region of the graphical interface 208. In some aspects, being positioned in a common region can involve an overlap between the visual representations 210a, 210b in a region 404, as described above with respect to FIGS. 4 and 6. In additional or alternative aspects, being positioned in a common region can involve contact between edges or other portions of the visual representations 210a, 210b in the common region. In other aspects, being positioned in a common region can involve the visual representations 210a, 210b being positioned within a threshold distance of one another or some portion of the graphical interface 208.

The method 700 also involves authorizing the first client and the second client to collaboratively modify electronic content accessible via the graphical interface, as depicted in block 706. For example, a processing device can execute suitable program code, such as one or more components of the workspace application 202, that is stored in a non-transitory computer readable medium. Executing the workspace application 202 can configure the processing device to perform operations such as, for example, authorizing one or more clients 214a in the group 212a and one or more clients 214b in the group 212b to collaboratively modify electronic content 408 accessible via the graphical interface 208, as described above with respect to FIG. 4. The workspace application 202 can authorize the collaboration in the region 404 based on determining that the first visual representation and the second visual representation are positioned in the common region.

The method 700 also involves subsequently determining that the first visual representation and the second visual representation are positioned outside the common region, as depicted in block 708. For example, a processing device can execute suitable program code, such as one or more components of the workspace application 202, that is stored in a non-transitory computer readable medium. Executing the workspace application 202 can configure the processing device to perform operations such as, for example, determining that the visual representations 210a, 210b are positioned outside of the region 404 of the graphical interface. The determination can occur subsequent to a time period in which the content 408 was collaboratively modified, as described above with respect to FIG. 5.

The method 700 also involves restricting each client to modifying a respective content portion that was modified by the client when both visual representations were in the common region, as shown in block 710. For example, a processing device can execute suitable program code, such as one or more components of the workspace application 202, that is stored in a non-transitory computer readable medium. Executing the workspace application 202 can configure the processing device to perform operations such as, for example, restricting clients in group 212a to modifying the content portion 410a and restricting clients in group 212b to modifying the content portion 410b, as described above with respect to FIG. 5. The restrictions on the groups 212a, 212b can be enforced based on the visual representations 210a, 210b moving away from the region 404.

The authorizations and restrictions performed by method 700 can be implemented in any suitable manner. In some aspects, authorizing or restricting actions by one or more clients in the collaborative workspace 206 can involve transmitting instructions or other messages to an instance of interaction application or other client application for accessing the collaborative workspace 206. The workspace application 202 can configure a processing device to transmit the instructions or other messages via the data network 108 or via any other suitable communication channel or network. The instructions or other messages can be transmitted via a suitable transceiver (e.g., a network interface of the interactive display device 102 and/or the server 110). The instructions or other messages can instruct or otherwise notify the interaction application or other client application to allow or prevent modifications to specific electronic content in the collaborative workspace 206. For example, an instruction or message can be received by the interaction application 204a from the workspace application 202. The received instruction or message can cause the interaction application 204a to allow one or more clients 214a to modify content that is accessible via a region of the graphical interface 208 occupied by or in contact with the visual representation 210a. The instruction or message can also cause the interaction application 204a to prevent one or more clients 214a from modifying content accessible via a different region of the graphical interface 208 that occupied by or in contact with the visual representation 210b rather than the visual representation 210a.

Figure 8:
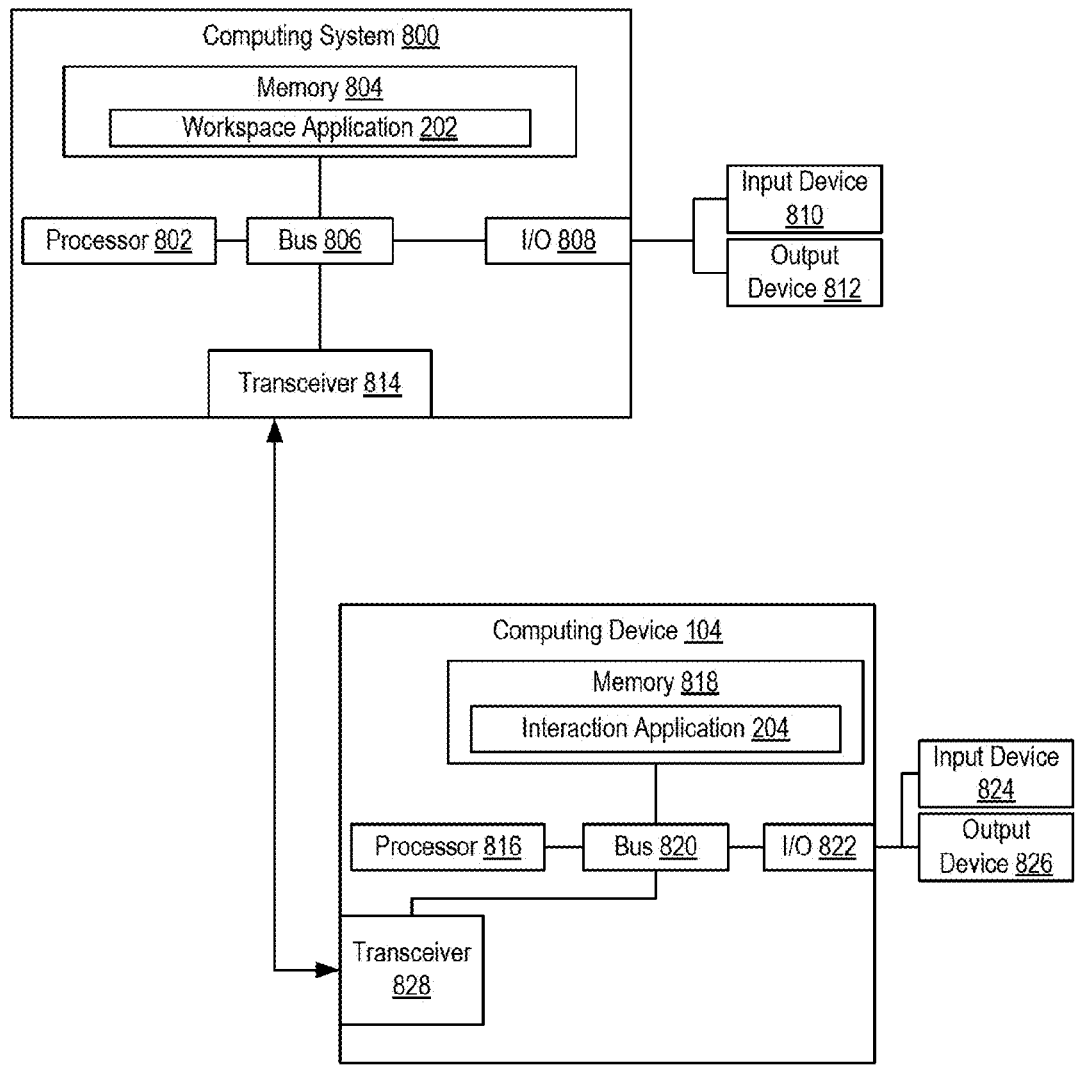
FIG. 8 is a block diagram depicting examples of a computing system and a computing device that can operate in a collaborative environment according to certain aspects of the present invention.

Any suitable system implementation can be used to implement the aspects and examples described above with respect to FIGS. 1-7. For example, FIG. 8 is a block diagram depicting examples of a computing system 800 and a computing device 104 that can operate in a collaborative environment.

The computing system 800 (e.g., one or more of the interactive display device 102 and the server 110) and the computing device 104 can respectively include processors 802, 816 that are communicatively coupled to respective memory devices 804, 818. The processors 802, 816 can execute computer-executable program code and/or access information stored in the memory devices 804, 818. The processor 802 can execute a workspace application 202 and/or other computer-executable program code stored in the memory device 804. The processor 816 can execute an interaction application 204 and/or other computer-executable program code stored in the memory device 818. When executed by the processors 802, 816 the program code stored in the memory devices 804, 818 can cause the processor to perform the operations described herein. Examples of each of the processors 802, 816 include a microprocessor, an application-specific integrated circuit ("ASIC"), a state machine, or other processing device. Each of the processors 802, 816 can include any of a number of processing devices, including one.

Each of the memory devices 804, 818 can include any suitable non-transitory computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read program code. The program code may include processor-specific instructions generated by a compiler and/or an interpreter from code written in any suitable computer-programming language, including, for example, C, C++, C#, Visual Basic, Java, Python, Perl, JavaScript, and ActionScript.

The computing system 800 and the computing device 104 can also respectively include buses 806, 820. Each of the buses 806, 820 can communicatively couple one or more components of a respective one of the computing system 800 and the computing device 104.

The computing system 800 and the computing device 104 can also respectively include a number of external or internal devices. For example, the computing system 800 and the computing device 104 can include input/output ("I/O") interfaces 808, 822. Each of the I/O interfaces 808, 822 can communicate input events and output events among components of the computing system 800 and the computing device 104, respectively. For example, the computing system 800 can include one or more input devices 810 and one or more output devices 812. The computing device 104 can include one or more input devices 824 and one or more output devices 826. The one or more input devices 810, 824 and one or more output devices 812, 826 can be communicatively coupled to the I/O interfaces 808, 822, respectively. The communicative coupling can be implemented via any suitable manner (e.g., a connection via a printed circuit board, connection via a cable, communication via wireless transmissions, etc.). Non-limiting examples of input devices 810, 824 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 812, 826 include an LCD screen, an external monitor, a speaker, or any other device that can be used to display or otherwise present outputs generated by a computing device.

For illustrative purposes, FIG. 8 depicts input devices 810, 824 and output devices 812, 826 as included in the computing system 800 and the computing device 104. However, any suitable implementation of a computing system 800 and/or a computing device 104 with respect to the input devices 810, 824 and output devices 812, 826 can be used. For example, a device such as a touch screen can be separate from and communicatively coupled to a computing device. A touch screen can function as both an input device and an output device.

The computing system 800 can also include one or more transceivers 814 and the computing device 104 can include one or more transceivers 828. The transceivers 814, 828 can include any device or group of devices suitable for establishing a wired data connection, a wireless data connection, or some combination thereof. Non-limiting examples of the transceivers 814, 828 include one or more of an Ethernet network adapter, an RF transceiver, a modem, an optical emitter, an optical transceiver, etc.

Although, for illustrative purposes, FIG. 8 depicts the processor 802, the memory device 804, the bus 806, the I/O interface 808, the input device 810, the output device 812, and the transceiver 814 as being included within the computing system 800, other implementations are possible. For example, in some aspects, one or more of the processor 802, the memory device 804, the bus 806, the I/O interface 808, the input device 810, the output device 812, and the transceiver 814 can be separate devices that are communicatively coupled with one or more other components of the computing system 800. In additional or alternative aspects, one or more of the processor 802, the memory device 804, the bus 806, the I/O interface 808, the input device 810, the output device 812, and the transceiver 814 can be included in a separate computing device (e.g., a server) that is communicatively coupled with one or more other components of the computing system 800.

In some aspects, a computing system or environment can include at least one computing system 800. In additional or alternative aspects, a system can be formed by establishing communication between at least one computing system 800 and multiple computing devices 104.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation and are not meant to be limiting.

While the present subject matter has been described in detail with respect to specific examples thereof, it will be appreciated that those skilled in the art, upon attaining an understanding of the foregoing may readily produce alterations to, variations of, and equivalents to such aspects and examples. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed:

1. A method comprising:
configuring a display device to display, in a graphical interface representing a collaborative workspace, a first visual representation representing a first client and a second visual representation representing a second client;
determining at a first point in time that the first visual representation and the second visual representation are positioned in a common region of the graphical interface;
based the first visual representation and the second visual representation being positioned in the common region, authorizing the first client and the second client to collaboratively modify electronic content accessible via the graphical interface;
determining at a second point in time that the first visual representation and the second visual representation are positioned outside the common region; and
based on the first visual representation and the second visual representation being positioned outside the common region, restricting the first client to modifying a first content portion from the electronic content that was modified by the first client when the first and second visual representations were in the common region and restricting the second client to modifying a second content portion from the electronic content that was modified by the second client when the first and second visual representations were in the common region.

2. The method of claim 1, further comprising:
determining that the second visual representation and a third visual representation representing a third client are positioned in an additional common region of the graphical interface;
based on determining that the second visual representation and the third visual representation are positioned in the additional common region, authorizing the second client and the third client to collaboratively modify at least one content portion from the electronic content other than the first content portion that was modified by the first client; and
preventing the second client and the third client from modifying the first content portion.

3. The method of claim 1, further comprising:
  determining that the second visual representation and a third visual representation representing a third client are positioned in an additional common region of the graphical interface;
  based on determining that the second visual representation and the third visual representation are positioned in the additional common region, authorizing the second client and the third client to collaboratively modify at least one content portion from the electronic content other than the first content portion that was modified by the first client;
  detecting, in the additional common region, an attempt to modify the first content portion; and
  performing at least one of:
    preventing the second client and the third client from modifying the first content portion based on receiving a denial of authorization from the first client; and
    authorizing the second client and the third client to modify the first content portion based on receiving an authorization from the first client.

4. The method of claim 1, further comprising generating a first copy of the electronic content for the first client and a second copy of the electronic content for the second client;
  moving a visual representation of the first copy outside the common region with the first visual representation for the first client, wherein the first client is restricted to modifying the first content portion in the first copy;
  moving a visual representation of the second copy outside the common region with the second visual representation for the second client, wherein the second client is restricted to modifying the second content portion in the second copy.

5. The method of claim 1, wherein authorizing the first client and the second client to collaboratively modify the electronic content comprises:
  transmitting a first message to a first instance of a client application for accessing the collaborative workspace, wherein the first message notifies the first instance of the client application to allow modifications to the electronic content by the first client; and
  transmitting a second message to a second instance of the client application for accessing the collaborative workspace, wherein the second message notifies the second instance of the client application to allow modifications to the electronic content by the second client;
  wherein restricting the first and second clients comprises transmitting additional messages to the first and second instances of the client application indicating restrictions on modifications to the electronic content.

6. The method of claim 1, further comprising:
  identifying a moderator client authorized to access all content in the collaborative workspace; and
  receiving instructions from the moderator client to move the first and second visual representations to the common region, wherein a position of the first visual representation and the second visual representation in the common region is determined based on the received instructions.

7. The method of claim 1, wherein the first visual representation represents a first plurality of clients including the first client and the second visual representation represents a second plurality of clients including the second client, the method further comprising:
  receiving first messages from a first required subset of the first plurality of clients to move the first visual representation to the common region; and
  receiving second messages from a second required subset of the second plurality of clients to move the second visual representation to the common region,
  wherein a position of the first visual representation and the second visual representation in the common region is determined based on receiving the first messages from the first required subset and receiving the second messages from the second required subset.

8. A system comprising:
  a processing device; and
  a non-transitory computer-readable medium that is communicatively coupled to the processing device,
  wherein the processing device is configured for executing program code stored in the non-transitory computer-readable medium to perform operations comprising:
    configuring a display device to display, in a graphical interface representing a collaborative workspace, a first visual representation representing a first client and a second visual representation representing a second client,
    determining that the first visual representation and the second visual representation are positioned in a common region of the graphical interface,
    authorizing the first client and the second client to collaboratively modify electronic content accessible via the graphical interface based the first visual representation and the second visual representation being positioned in the common region,
    subsequently determining that the first visual representation and the second visual representation are positioned outside the common region, and
    based on the first visual representation and the second visual representation being positioned outside the common region, restricting the first client to modifying a first content portion from the electronic content that was modified by the first client when the first and second visual representations were in the common region and restricting the second client to modifying a second content portion from the electronic content that was modified by the second client when the first and second visual representations were in the common region.

9. The system of claim 8, wherein the operations further comprise:
  determining that the second visual representation and a third visual representation representing a third client are positioned in an additional common region of the graphical interface;
  based on determining that the second visual representation and the third visual representation are positioned in the additional common region, authorizing the second client and the third client to collaboratively modify at least one content portion from the electronic content other than the first content portion that was modified by the first client; and
  preventing the second client and the third client from modifying the first content portion.

10. The system of claim 8, wherein the operations further comprise:
  determining that the second visual representation and a third visual representation representing a third client are positioned in an additional common region of the graphical interface;
  based on determining that the second visual representation and the third visual representation are positioned in the additional common region, authorizing the second client and the third client to collaboratively modify at least one content portion from the electronic content other than the first content portion that was modified by the first client;

detecting, in the additional common region, an attempt to modify the first content portion; and performing at least one of:
preventing the second client and the third client from modifying the first content portion based on receiving a denial of authorization from the first client; and
authorizing the second client and the third client to modify the first content portion based on receiving an authorization from the first client.

11. The system of claim 8, wherein the operations further comprise generating a first copy of the electronic content for the first client and a second copy of the electronic content for the second client;
moving a visual representation of the first copy outside the common region with the first visual representation for the first client, wherein the first client is restricted to modifying the first content portion in the first copy;
moving a visual representation of the second copy outside the common region with the second visual representation for the second client, wherein the second client is restricted to modifying the second content portion in the second copy.

12. The system of claim 8, wherein authorizing the first client and the second client to collaboratively modify the electronic content comprises:
transmitting a first message to a first instance of a client application for accessing the collaborative workspace, wherein the first message notifies the first instance of the client application to allow modifications to the electronic content by the first client; and
transmitting a second message to a second instance of the client application for accessing the collaborative workspace, wherein the second message notifies the second instance of the client application to allow modifications to the electronic content by the second client;
wherein restricting the first and second clients comprises transmitting additional messages to the first and second instances of the client application indicating restrictions on modifications to the electronic content.

13. The system of claim 8, wherein the operations further comprise:
identifying a moderator client authorized to access all content in the collaborative workspace; and
receiving instructions from the moderator client to move the first and second visual representations to the common region, wherein a position of the first visual representation and the second visual representation in the common region is determined based on the received instructions.

14. The system of claim 8, wherein the first visual representation represents a first plurality of clients including the first client and the second visual representation represents a second plurality of clients including the second client, wherein the operations further comprise:
receiving first messages from a first required subset of the first plurality of clients to move the first visual representation to the common region; and
receiving second messages from a second required subset of the second plurality of clients to move the second visual representation to the common region,
wherein a position of the first visual representation and the second visual representation in the common region is determined based on receiving the first messages from the first required subset and receiving the second messages from the second required subset.

15. A non-transitory computer-readable medium storing program code executable by a processor, the program code comprising:
program code for configuring a display device to display, in a graphical interface representing a collaborative workspace, a first visual representation representing a first client and a second visual representation representing a second client;
program code for determining that the first visual representation and the second visual representation are positioned in a common region of the graphical interface;
program code for authorizing the first client and the second client to collaboratively modify electronic content accessible via the graphical interface based the first visual representation and the second visual representation being positioned in the common region;
program code for subsequently determining that the first visual representation and the second visual representation are positioned outside the common region; and
program code for restricting, based on the first visual representation and the second visual representation being positioned outside the common region, the first client to modifying a first content portion from the electronic content that was modified by the first client when the first and second visual representations were in the common region and restricting the second client to modifying a second content portion from the electronic content that was modified by the second client when the first and second visual representations were in the common region.

16. The non-transitory computer-readable medium of claim 15, wherein the program code further comprises:
program code for determining that the second visual representation and a third visual representation representing a third client are positioned in an additional common region of the graphical interface;
program code for authorizing, based on determining that the second visual representation and the third visual representation are positioned in the additional common region, the second client and the third client to collaboratively modify at least one content portion from the electronic content other than the first content portion that was modified by the first client; and
program code for preventing the second client and the third client from modifying the first content portion.

17. The non-transitory computer-readable medium of claim 15, wherein the program code further comprises:
program code for determining that the second visual representation and a third visual representation representing a third client are positioned in an additional common region of the graphical interface;
program code for authorizing, based on determining that the second visual representation and the third visual representation are positioned in the additional common region, the second client and the third client to collaboratively modify at least one content portion from the electronic content other than the first content portion that was modified by the first client;
program code for detecting, in the additional common region, an attempt to modify the first content portion; and
program code for performing at least one of:
preventing the second client and the third client from modifying the first content portion based on receiving a denial of authorization from the first client; and authorizing the second client and the third client to modify the first content portion based on receiving an authorization from the first client.

18. The non-transitory computer-readable medium of claim 15, wherein the program code further comprises program code for generating a first copy of the electronic content for the first client and a second copy of the electronic content for the second client,
moving a visual representation of the first copy outside the common region with the first visual representation for the first client, wherein the first client is restricted to modifying the first content portion in the first copy;
moving a visual representation of the second copy outside the common region with the second visual representation for the second client, wherein the second client is restricted to modifying the second content portion in the second copy.

19. The non-transitory computer-readable medium of claim 15, wherein authorizing the first client and the second client to collaboratively modify the electronic content comprises:
transmitting a first message to a first instance of a client application for accessing the collaborative workspace, wherein the first message notifies the first instance of the client application to allow modifications to the electronic content by the first client; and
transmitting a second message to a second instance of the client application for accessing the collaborative workspace, wherein the second message notifies the second instance of the client application to allow modifications to the electronic content by the second client;
wherein restricting the first and second clients comprises transmitting additional messages to the first and second instances of the client application indicating restrictions on modifications to the electronic content.

20. The non-transitory computer-readable medium of claim 15, wherein the program code further comprises:
program code for identifying a moderator client authorized to access all content in the collaborative workspace; and
program code for receiving instructions from the moderator client to move the first and second visual representations to the common region, wherein a position of the first visual representation and the second visual representation in the common region is determined based on the received instructions.

21. The non-transitory computer-readable medium of claim 15, wherein the first visual representation represents a first plurality of clients including the first client and the second visual representation represents a second plurality of clients including the second client, further comprising:
receiving first messages from a first required subset of the first plurality of clients to move the first visual representation to the common region; and
receiving second messages from a second required subset of the second plurality of clients to move the second visual representation to the common region,
wherein a position of the first visual representation and the second visual representation in the common region is determined based on receiving the first messages from the first required subset and receiving the second messages from the second required subset.

* * * * *